(12) United States Patent
Bossini

(10) Patent No.: US 11,826,679 B2
(45) Date of Patent: Nov. 28, 2023

(54) FILTER FOR THE TREATMENT OF A FLUID IN A HEATING AND/OR COOLING SYSTEM

(71) Applicant: RBM IBOX S.R.L.

(72) Inventor: Guido Bossini, Brescia (IT)

(73) Assignee: R.B.M. S.P.A., Loc. S. Giovanni (IT)

( * ) Notice: Subject to any disclaimer, the term of this patent is extended or adjusted under 35 U.S.C. 154(b) by 256 days.

(21) Appl. No.: 17/416,804

(22) PCT Filed: Dec. 19, 2019

(86) PCT No.: PCT/IB2019/061106
§ 371 (c)(1),
(2) Date: Jun. 21, 2021

(87) PCT Pub. No.: WO2020/128954
PCT Pub. Date: Jun. 25, 2020

(65) Prior Publication Data
US 2022/0072453 A1  Mar. 10, 2022

(30) Foreign Application Priority Data
Dec. 20, 2018  (IT) ......................... 102018000020332

(51) Int. Cl.
*B01D 29/13* (2006.01)
*B01D 35/02* (2006.01)
(Continued)

(52) U.S. Cl.
CPC ............. *B01D 29/13* (2013.01); *B01D 35/02* (2013.01); *B01D 35/06* (2013.01); *B01D 35/153* (2013.01);
(Continued)

(58) Field of Classification Search
CPC ........ B01D 29/13; B01D 35/02; B01D 35/15; B01D 35/06; B01D 35/153; B03C 1/0332;
(Continued)

(56) References Cited

U.S. PATENT DOCUMENTS 3,289,841 A     12/1966  Quinting
2012/0031821 A1*  2/2012  Swain ................... B01D 35/30
                                                      210/232

FOREIGN PATENT DOCUMENTS

EP    3 159 313 A1    4/2017
GB      864159       7/1959
(Continued)

OTHER PUBLICATIONS

International Preliminary Report on Patentability dated Jun. 16, 2021, issued in PCT Application No. PCT/IB2019/061106, file Dec. 19, 2019.
(Continued)

*Primary Examiner* — Liam Royce
(74) *Attorney, Agent, or Firm* — Workman Nydegger

(57) ABSTRACT

A filter for treating a fluid in a heating and/or cooling system includes: a first body, hollow and substantially cylindrical in shape, and a second body, wherein the first body and second body are mutually and sealingly connected, so as to internally have a chamber, and wherein the hollow first body is provided with a first mouth and a second mouth respectively having a first duct and a second duct allowing the fluid to enter and/or exit the chamber. A filtering element for treating the fluid is housed at least partially in the chamber, in particular the filtering element includes at least one magnetic element The filter includes a shut-off element having an outer wall provided with a channel and an opening, the shut-off element being housed in the first body in such a way that it can rotate about a longitudinal axis in the first body (Continued)

and alternately switch from a first position to a second position.

12 Claims, 4 Drawing Sheets

(51) Int. Cl.
| | | |
|---|---|---|
| *B01D 35/06* | (2006.01) | |
| *B01D 35/153* | (2006.01) | |
| *B03C 1/033* | (2006.01) | |
| *B03C 1/28* | (2006.01) | |
| *B03C 1/30* | (2006.01) | |
| *C02F 1/00* | (2023.01) | |
| *C02F 1/48* | (2023.01) | |
| *F24D 19/00* | (2006.01) | |
| *C02F 103/02* | (2006.01) | |

(52) U.S. Cl.
CPC ............ *B03C 1/0332* (2013.01); *B03C 1/288* (2013.01); *B03C 1/30* (2013.01); *C02F 1/001* (2013.01); *C02F 1/488* (2013.01); *F24D 19/0092* (2013.01); *B03C 2201/18* (2013.01); *C02F 2103/023* (2013.01); *C02F 2201/004* (2013.01); *C02F 2201/005* (2013.01); *C02F 2201/006* (2013.01); *C02F 2307/14* (2013.01)

(58) Field of Classification Search
CPC ....... B03C 1/288; B03C 1/30; B03C 2201/18; C02F 1/001; C02F 1/488; C02F 2103/023; C02F 2201/004; C02F 2201/005; C02F 2201/006; C02F 2307/14; F24D 19/0092
See application file for complete search history.

(56) References Cited

FOREIGN PATENT DOCUMENTS

| | | |
|---|---|---|
| GB | 1 393 181 | 4/1971 |
| WO | 1996/04062 A1 | 2/1996 |
| WO | 2018/207083 A1 | 11/2018 |

OTHER PUBLICATIONS

Chinese Office Action dated Aug. 9, 2022, issued in Chinese Application No. 20198090690.5.
International Search Report dated Mar. 13, 2020, issued in PCT Application No. PCT/IB2019/061106, file Dec. 19, 2019.

* cited by examiner

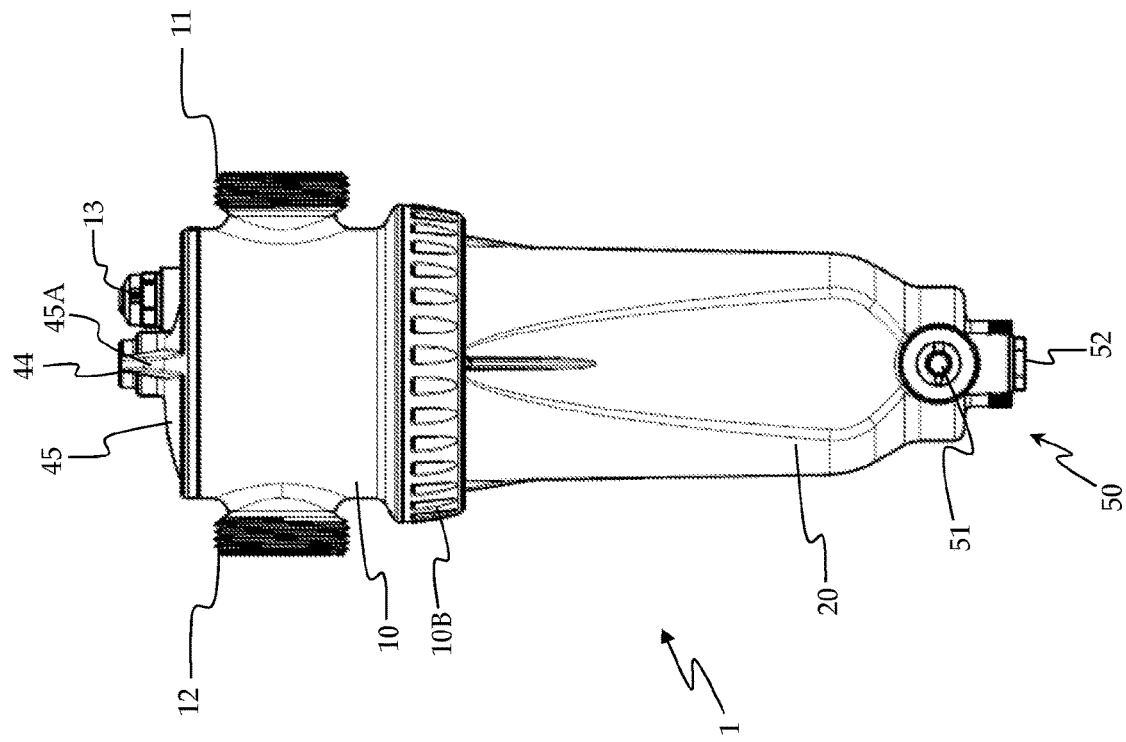
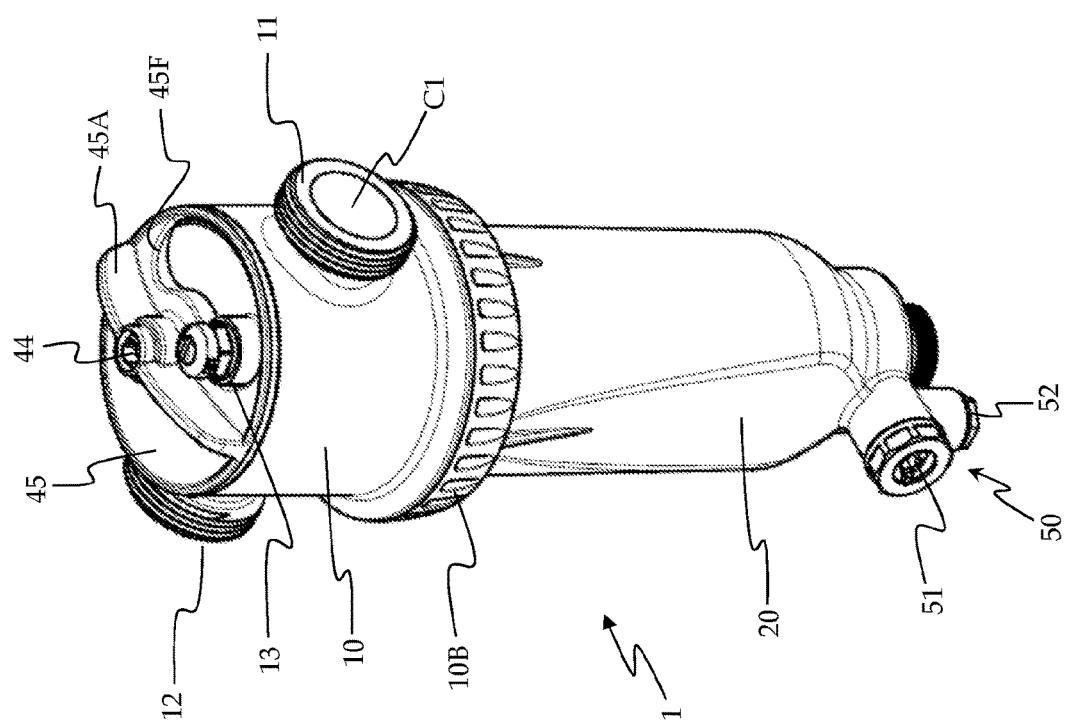
Fig. 1a
Fig. 1b

FILTER FOR THE TREATMENT OF A FLUID IN A HEATING AND/OR COOLING SYSTEM

BACKGROUND OF THE INVENTION

1. The Field of the Invention

The present invention relates to a filter for treating a fluid in a heating and/or cooling system, in particular of domestic and/or industrial type.

2. The Relevant Technology

It is known that, in thermal heating and/or cooling systems, whether of domestic or industrial type, it has become increasingly common to take all necessary actions aimed at keeping the heat-transfer fluid (usually water, possibly with the addition of glycol or other similar substances) as clean as possible from impurities that, especially in old systems, typically consist of high concentrations of ferrous particles released by system components, in particular pipes, radiators (normally made of iron) or other components.

Such impurities are circulated by a pump included in the system and tend to accumulate at critical points of the system, e.g., control elements (e.g., including valves) and any exchangers included in the generators (e.g., boilers, refrigerators, heat pumps, etc.); it is therefore clear that such impurities will tend to impair the proper and efficient operation of said components and, if not properly removed, may reduce the efficiency of the system over time and lead to damaged components.

Moreover, such impurities may lead to perforation of the pipes due to corrosion; in fact, the accumulated impurities, in contact with the oxygen that is present in water, will tend to oxidize those parts of the system where they deposit and may cause corrosion of such parts, resulting in a perforated pipe.

It should be noted that the present invention is particularly useful in the field of heat pumps, the main members of which (in particular the exchangers) may have their operating characteristics seriously impaired by the presence of such polluting particles and impurities in the fluid.

For this reason, various techniques and methods exist in the art for removing impurities from the fluid circulating in the piping of a water supply network, in particular a heating and/or cooling system.

In particular, it is known in the art to use at least one filter associated with the heating and/or cooling system, in particular said filter comprising at least one magnetic filtering element that traps the ferrous impurities that are present in the system.

Usually said filter is associated with a pipe of the return circuit of the system for protecting the power generator (whether a heating power generator, e.g., a boiler, or a cooling power generator).

It is clear that the filters normally employed for heating and cooling system protection must be periodically maintained, in particular for the purpose of removing the residues of the impurities that have accumulated after the heat-transfer fluid has flowed through them many times.

One drawback of the filters known in the art is that, in order to remove the ferrous particles captured by the magnetic element, it is necessary to extract said magnetic element from the chamber in which it is housed; therefore, prior to removing the ferrous particles it is necessary to completely drain the liquid circulating in the heating and cooling system.

In other cases, maintenance work can be carried out by interrupting the circulation of the heat-transfer fluid through the filter, and this is usually done by arranging, upstream and downstream of the filter, suitable shut-off valves that make it possible to isolate the filter from the rest of the system in order to be able to remove the residues of the impurities that have accumulated therein.

However, this solution has some drawbacks as well, in that the association of the filter and shut-off valves with the system inevitably requires the use of many components and is sometimes made very difficult by the limited space left available in modern heating and cooling systems.

A further drawback of the above-described solution lies in the fact that it implies high costs, which are mainly due to the necessity of purchasing and mounting the shut-off valves in association with the filter; as such, this solution inevitably increases the complexity of installation of such components within the system.

SUMMARY OF THE INVENTION

In this frame, it is the main object of the present invention to provide a filter for treating a fluid in a piping of a heating and/or cooling system, in particular of domestic and/or industrial type, which is so realized as to overcome the drawbacks of the prior art.

In particular, it is one object of the present invention to provide a filter for treating a fluid in a heating and/or cooling system, in particular of domestic and/or industrial type, which is so realized that it can be easily subjected to maintenance work for removing the residues of the impurities accumulated therein after the heat-transfer fluid has flowed through it many times.

It is a further object of the present invention to provide a filter for treating a fluid in a heating and/or cooling system, in particular of domestic and/or industrial type, which is so realized that it can be optimally installed in the system without requiring the use of any additional components, such filter being particularly fit for installation even in the limited space left available in modern heating and cooling systems.

It is yet another object of the present invention to provide a solution conceived in such a way as to ensure proper operation while at the same time considerably reducing the costs and installation complexity of its components within the system.

Said objects are achieved by the present invention through a filter for treating a fluid in a heating and/or cooling system, in particular of domestic and/or industrial type, incorporating the features set out in the appended claims, which are an integral part of the present description.

BRIEF DESCRIPTION OF THE DRAWINGS

Further objects, features and advantages of the present invention will become apparent from the following detailed description and from the annexed drawings, which are supplied by way of non-limiting explanatory example, wherein:

FIGS. 1a and 1b respectively show a perspective view and a front view of a filter for treating a fluid in a heating and/or cooling system, in particular of domestic and/or industrial type, according to the present invention;

FIG. 3b shows a perspective view of a partial section (i.e., a section along incident longitudinal planes) of an element shown in FIG. 3a;

DETAILED DESCRIPTION OF THE PREFERRED EMBODIMENTS

Figure 2:
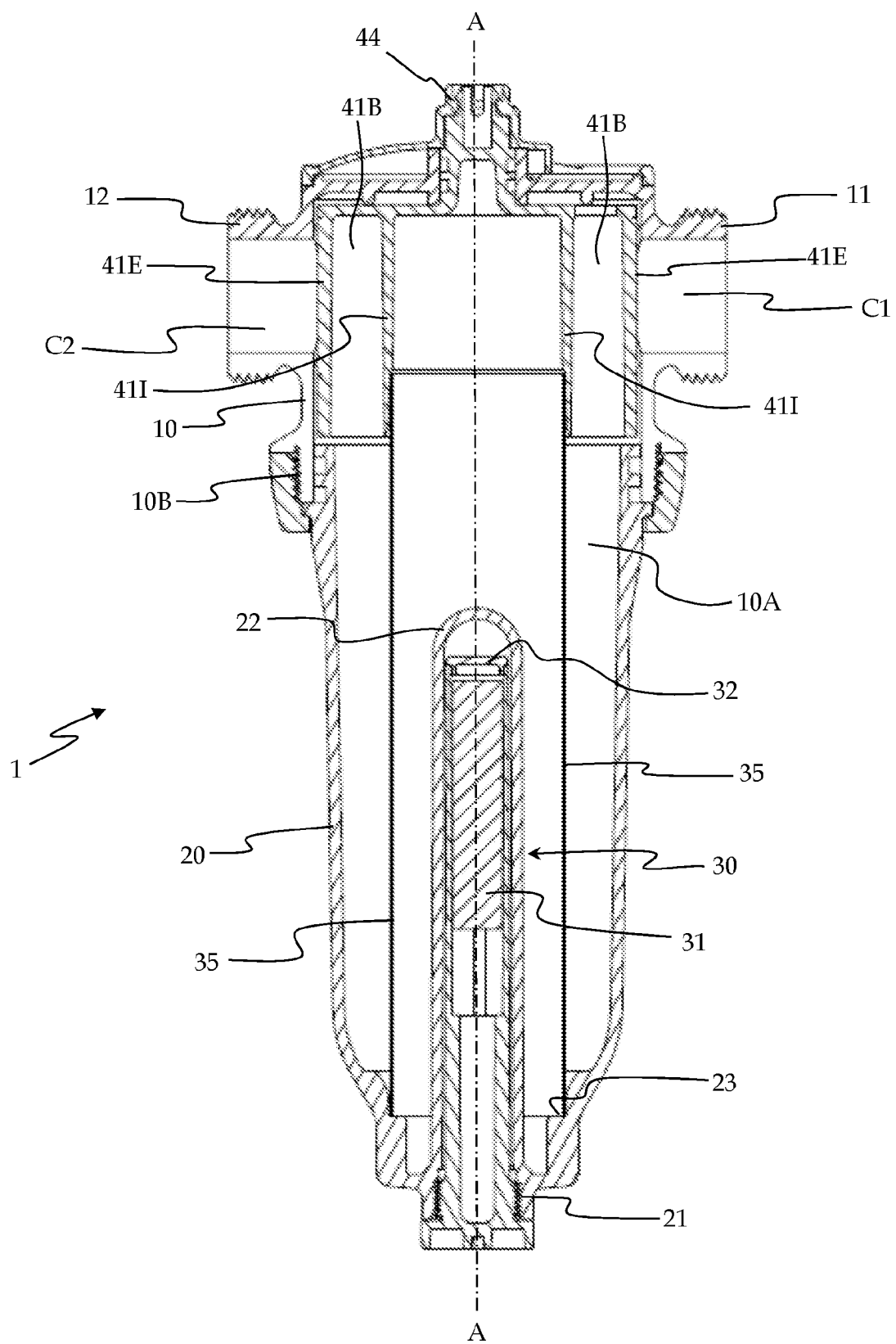
FIG. 2 shows a longitudinal sectional view of the filter according to the present invention.

In the annexed drawings, reference numeral 1 designates as a whole a filter for treating a fluid in a heating and/or cooling system, in particular of domestic and/or industrial type, according to the present invention.

The filter 1 comprises a first body 10, hollow and substantially cylindrical in shape, and a second body 20, wherein said first body 10 and said second body 20 are mutually and sealingly connected, so as to internally comprise a chamber 10A.

Figure 3B:
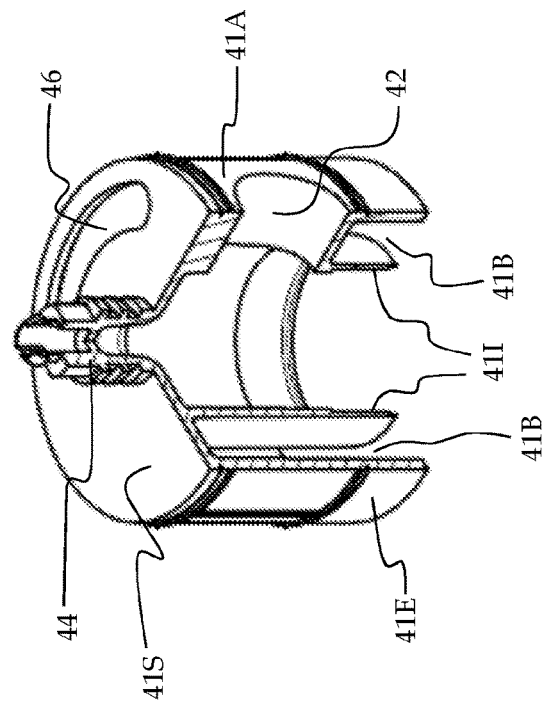
Figure 3A:
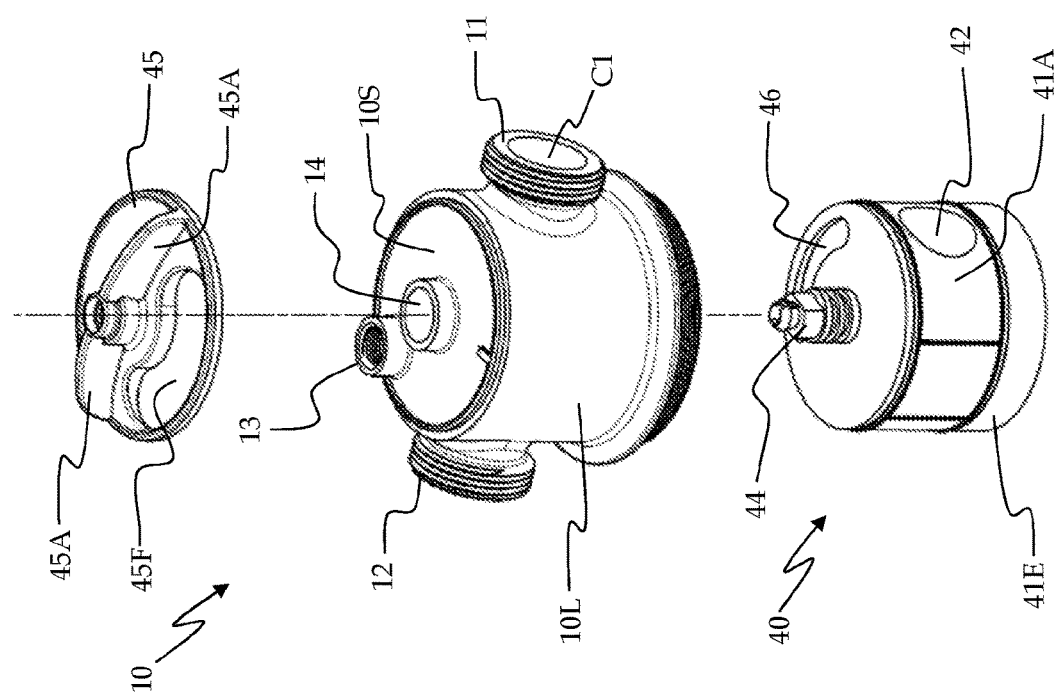
FIG. 3a shows an exploded perspective view of some components of the filter according to the present invention.

In particular, as best shown in FIG. 3a, the first body 10 comprises a substantially tubular lateral portion 10L associated with an upper portion 10S; in substance, the first body 10 has a cup-like shape, in particular resembling an upside-down cup (as shown in the annexed drawings) when the filter 1 is associated with the heating and/or cooling system.

As can be best seen in FIG. 2, the sealed connection between the first body 10 and the second body 20 may be obtained by means of a threaded coupling between a ring nut 10B and respective threads of the first body 10 and of the second body 20, preferably with the interposition of a sealing element, e.g., a gasket (not shown); it is clear that said connection may also be obtained otherwise, for example by screwing the first body 10 to the second body 20 or by joining said components by means of a bayonet-type coupling.

It should be noted that, in the embodiment shown in the annexed drawings, the second body 20 is also shown as a hollow element having a substantially cylindrical shape, though slightly more elongated than the first body 10; it is however clear that the second body 20 of the filter 1 may also have a different conformation than shown in the annexed drawings.

When the filter 1 is in operation, the first body 10 and the second body 20 are positioned one on top of the other, thus defining a substantially vertical longitudinal axis A-A (shown in FIG. 2). It is however clear that the filter 1 may also be positioned otherwise in operation, i.e., in such a way that said longitudinal axis A-A is not substantially vertical.

Said hollow first body 10 is provided with a first mouth 11 and a second mouth 12 respectively comprising a first duct C1 and a second duct C2 allowing the fluid to enter and/or exit the chamber 10A. As a consequence, the first duct C1 and the second duct C2 are suitable for putting the chamber 10A of the filter 1 in communication with the other components of the heating and/or cooling system, in particular with the pipes of said system.

In accordance with a preferred embodiment, the first mouth 11 and the second mouth 12 are so realized as to have substantially the same conformation. In particular, the first mouth 11 and the second mouth 12 have substantially the same dimensions and shape. In this respect, the first mouth 11 and the second mouth 12 comprise similar or correspondent connection means; for example, said connection means may consist of equal threads provided on the outer sides of said first mouth 11 and second mouth 12, wherein the term "outer sides" is meant to define the surface of the mouths 11, 12 which is opposite to that which faces towards the first duct C1 and the second duct C2, respectively.

Still in accordance with a preferred embodiment, said first mouth 11 and second mouth 12 are formed on the lateral portion 10L of the first body 10 and are diametrically opposite to each other, i.e., they are positioned on the lateral portion 10L of the first body 10 in opposite zones with respect to the longitudinal axis A-A of the filter 1. In substance, the first mouth 11 and the second mouth 12 are configured in a manner such that the incoming and outgoing flow of fluid will results to be substantially perpendicular to the longitudinal axis A-A of the filter 1.

Moreover, the filter 1 comprises a filtering element 30 for treating the fluid, housed at least partially in said chamber 10A, in particular said filtering element 30 comprising at least one magnetic element 31 adapted to intercept and trap the ferrous impurities that are present in the fluid to be treated.

In a preferred embodiment, said at least one magnetic element 31 has a substantially rod-like shape and is positioned inside the chamber 10A so as to substantially coincide with or so as to be substantially parallel to the longitudinal axis A-A of the filter 1.

Figure 4A:
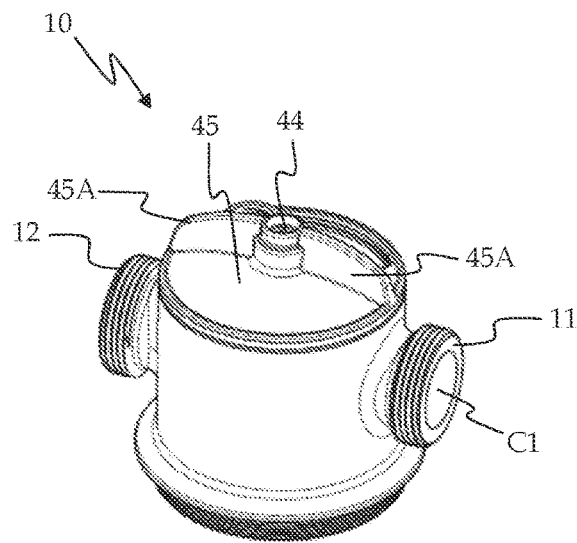
FIGS. 4a and 4b respectively show a perspective view and a longitudinally sectioned side view of the filter components shown in FIGS. 3a and 3b, said components being shown in a first operating condition, FIGS. 5a and 5b respectively show a perspective view and a longitudinally sectioned side view of the filter components shown in FIGS. 3a and 3b, said components being shown in a second operating condition.
Figure 4B:
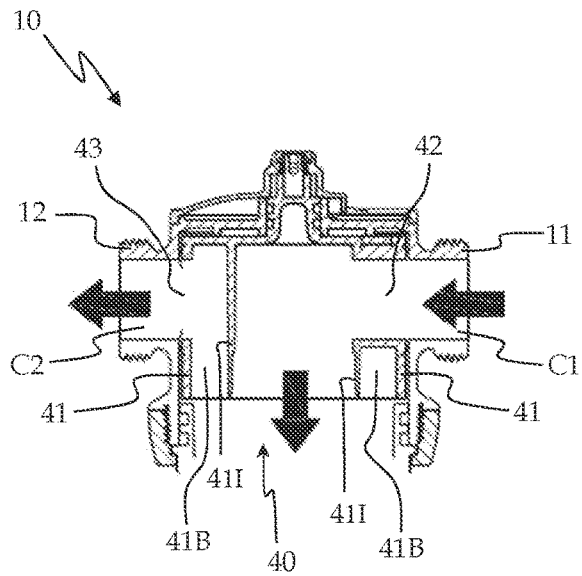
Figure 5A:
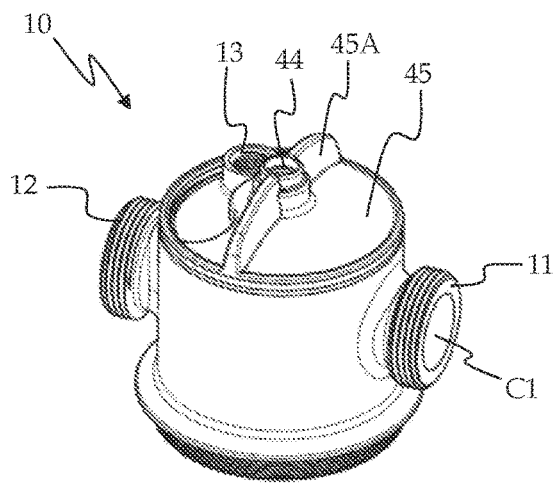
Figure 5B:
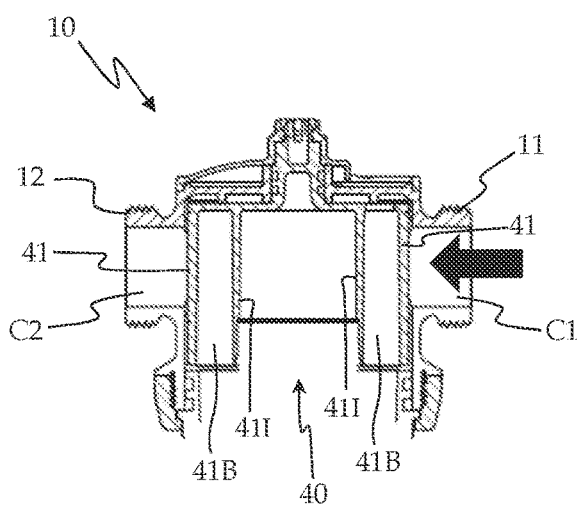

In accordance with the present invention, the filter 1 comprises a shut-off element (indicated as a whole by reference numeral 40 in the annexed drawings) comprising an outer wall 41E provided with a channel 42 and an opening 43 (visible in FIG. 4b), said shut-off element 40 being housed in the first body 10 in a manner such that it can rotate in said first body 10 about a longitudinal axis and alternately switch:

from a first position (which can also be defined as "open" position, such position being shown in FIGS. 4a and 4b), in which said shut-off element 40 is positioned in such a way as to allow the flow of fluid to enter the chamber 10A via the communication (which may also be defined as an at least partial alignment) of the first duct C1 with the channel 42 and to exit the chamber 10A via the communication (or an at least partial alignment) of the opening 43 with the second duct C2;

to a second position (which can also be defined as "closed" position, such position being shown in FIGS. 2, 5a and 5b), in which said shut-off element 40 is positioned in such a way that the outer wall 41E obstructs the first duct C1 and prevents the flow of fluid from entering the chamber 10A.

It must be pointed out that the term "alternately" refers to the fact that the shut-off element 40 can be rotated in the first body to switch either from the first "open" position to the second "closed" position, as described, or from the second "closed" position to the first "open" position.

In particular, in the second "closed" position the shut-off element 40 is positioned in such a way that the outer wall 41E obstructs the first duct C1 and the channel 42 is not aligned with said first duct C1, meaning that said channel 42 does not face, even partially, the first duct C1; at the same time, in said second "closed" position the opening 43 is not aligned with the second duct C2 (meaning that the opening 43 does not face, even partially, said second duct C2) and the outer wall 41E obstructs also said second duct C2.

As it can be seen in the annexed drawings, the shut-off element 40 has a cup-like shape that is substantially complementary to that of the first body 10, in particular said shut-off element 40 being so realized as to have slightly smaller dimensions than those of the inner walls of the first body 10, i.e., the walls of the first body 10 that delimit (together with the inner walls of the second body 20) the chamber 10A. In substance, the outer wall 41E of the shut-off element 40 is so realized as to have a conformation substantially corresponding to that of the inner wall of the lateral portion 10L of the first body 10 to which it is coupled, said outer wall 41E having a substantially tubular conformation and a diameter and dimensions slightly smaller than those of the inner wall of the lateral portion 10L of the first body 10; such a conformation also permits the rotation of the shut-off element 40 about its longitudinal axis within the first body 10, as well as the achievement of optimal hydraulic sealing between the outer wall 41E and the first duct C1 when the shut-off element 40 is in said second "closed" position.

Furthermore, in the annexed drawings the shut-off element 40 is shown to be positioned in the first body 10 in such a way that the longitudinal axis of the shut-off element 40 substantially coincides with the axis A-A of the filter 1; as a consequence, in the annexed drawings the longitudinal axis of the shut-off element 40 is not represented. It is however possible to position the shut-off element 40 in the first body 10 in a manner such that its longitudinal axis does not perfectly coincide with the axis A-A of the filter 1 or is offset relative to it; in fact, for the purposes of the present invention, the shut-off element 40 must be positioned inside the first body 10 in such a way that it can rotate about its own axis while at the same time allowing its outer wall 41E to effect an obstruction, with optimal hydraulic sealing, of the first duct C1 when the shut-off element 40 is in said second "closed" position.

Preferably, the channel 42 and the opening 43 are formed on the outer wall 41E and are positioned on said outer wall 41E in mutually opposite zones with respect to the longitudinal axis A-A of the filter 1; in such an embodiment, the channel 42 is shaped as a duct having a direction substantially radial, i.e., a direction substantially perpendicular to the longitudinal axis A-A of the filter 1.

It should be noted that the filter 1 may comprise at least one sealing element 41A to avoid any leakage of fluid between the outer wall 41E of the shut-off element 40 and said first body 10. In a preferred embodiment, said at least one sealing element 41A is made of rubber and the outer wall 41 is made of plastic, said components being mutually associated by co-moulding of the rubber sealing element 41A on the plastic outer wall 41. It is however apparent that the outer wall 41 and the sealing element 41A may also be realized otherwise and be coupled together differently (e.g., by mechanical assembly).

In accordance with the present invention, the shut-off element 40 comprises an inner wall 411 developing substantially parallel to the longitudinal axis A-A of the filter 1, said inner wall 411 being adapted to divert the flow of fluid coming from the channel 42 towards the filtering element 30; in this regard, it is clear that such diversion of the fluid flow will occur when the shut-off element 40 in in said first "open" position.

In a preferred embodiment shown in FIGS. 3a and 3b, said inner wall 411 also has a substantially tubular conformation and is positioned substantially concentrical within the outer wall 41E; in substance, in such an embodiment and in a longitudinal section view of the shut-off element 40 (like the one shown in FIGS. 2, 4b and 5b), the outer wall 41E and the inner wall 411 are substantially parallel to each other.

As can be best seen in FIG. 3b, in this embodiment the channel 42 is so designed that it crosses the outer wall 41E and the inner wall 411, running past an interspace 41B that is present between said walls 41E, 41I; in accordance with such provisions, the channel 42 makes it possible to put the first duct C1 in communication with the portion of the chamber 10A contained within said inner wall 411, so that the flow of fluid will be diverted after hitting said inner wall 411 (in particular, after hitting the side of the inner wall 411 facing towards the centre of the shut-off element 40; this situation will become apparent by observing the inner wall 411 shown in FIG. 4b).

In accordance with the present invention, the shut-off element 40 is preferably so realized as to comprise actuating means 44, 45 (best visible in FIGS. 3a and 3b) that allow acting upon said shut-off element 40 in order to cause it to rotate about its longitudinal axis, so as to switch from the first position to the second position, and vice versa.

In the embodiment shown in the annexed drawings, said actuating means comprise a pin 44 formed on a top wall 41S of the shut-off element 40, in particular said pin 44 being adapted to pass through a hole 14 formed on an upper portion 10S of the first body 10.

The actuating means may then comprise a knob 45 adapted to be coupled to the pin 44 to facilitate the rotation of said pin 44 and of the shut-off element 40.

Preferably, said knob 45 substantially has a discoid shape and is provided with at least one raised portion 45A that further facilitates the handling of the assembly consisting of the knob 45, the pin 44 and the shut-off element 40.

Furthermore, the raised portion 45A is shaped as an elongated protrusion formed on said knob 45 and substantially coinciding with the diameter of said discoid knob 45.

Such a conformation of the raised portion 45A facilitates the correct positioning of the shut-off element 40, in particular in the case of the preferred embodiment of the present invention, wherein the first mouth 11 and the second mouth 12 are located on opposite sides of the first body 10.

In fact, when the shut-off element 40 is in the first "open" position (as shown in FIGS. 4a and 4b), the knob 45 is preferably associated with the pin 44 in a manner such that the raised portion 45A is aligned with a straight line joining the first mouth 11 to the second mouth 12.

On the contrary, when the shut-off element 40 is in the second "closed" position (as shown in FIGS. 1a, 2, 5a and 5b), the knob 45 is preferably associated with the pin 44 in a manner such that the raised portion 45A is substantially perpendicular to (or anyway incident on) a straight line joining the first mouth 11 to the second mouth 12.

The peculiar provisions of the shut-off element 40 in accordance with the present invention allow overcoming the drawbacks of prior-art filters for treating a fluid in a heating and/or cooling system, in particular of domestic and/or industrial type.

In fact, such provisions provide a filter 1 realized in a manner such that it can be easily subjected to maintenance work for the removal of the impurities that have accumulated after the heat-transfer fluid has flowed through it many times.

In particular, such maintenance work can be carried out after rotating the shut-off element 40 from the first "open" position to the second "closed" position, so as to prevent the flow of fluid from entering the chamber 10A and allow a user/operator to properly clean the filtering element 30. When maintenance is complete, the filter 1 can be brought back into the normal working condition by rotating the shut-off element 40 from the second "closed" position to the first "open" position. It is therefore apparent that the provision of the shut-off element 40 makes it possible to realize the filter 1 according to the present invention in such a way that it can be optimally installed in a system without requiring the use of any additional components, such as, for example, shut-off valves positioned upstream and downstream of the filter 1; as a result, the filter 1 according to the present invention turns out to be particularly suitable for installation even in the limited space left available in modern heating and cooling systems.

In a preferred embodiment, the filter 1 according to the present invention comprises a port 13 (which can be defined as "multifunction" port) adapted to put the chamber 10A in communication with the environment outside the filter 1; for example, said port 13 may be associated with a pressure meter to measure the pressure of the fluid in said chamber 10A, or with an air venting device, or may be used as a port for connecting a temperature sensor, which in heat pump systems (which could be more specifically addressed by this invention) may become a very useful element for machine regulation purposes.

Preferably, said "multifunction" port 13 is associated with the upper portion 10S of the first body 10.

In such an embodiment, the shut-off element 40 comprises a slot 46 (visible in FIGS. 3a and 3b) adapted to allow said port 13 to communicate with the chamber 10A, in particular said slot 46 being formed on the upper wall 41S of the shut-off element 40 and being substantially shaped as a circular crown sector.

Moreover, in this embodiment the knob 45 has a respective slit 45F adapted to allow the port 13 to pass through and to allow the rotation movement of said knob 45 to switch the shut-off element 40 from the first "open" position to the second "closed" position, and vice versa. Preferably, the slit 45F is also substantially shaped as a circular crown sector. Furthermore, said slit 45F can be used as a guiding element and as a stopper element to correctly define the rotation that must occur in order to effect said switching of the shut-off element 40 from the first "open" position to the second "closed" position, and vice versa.

In accordance with the present invention, the filtering element 30 is coupled to the second body 20 of the filter 1.

In particular, said second body 20 comprises a passage 21 (shown in FIG. 2) adapted to allow the insertion of the filtering element 30 into the chamber 10A. In this regard, the passage 21 of the second body 20 and the filtering element 30 comprise mutual coupling means (e.g., respective threads) that allow fastening the filtering element 30 in said passage 21 of the second body 20. In a preferred embodiment, the second body 20 comprises a sheath 22 adapted to house the filtering element 30.

In addition, the filtering element 30 preferably comprises a magnet cartridge 32 adapted to house said at least one magnetic element 31, in particular said magnet cartridge 32 being in turn housed inside the sheath 22 of the second body 20.

As shown in FIG. 2, the magnet cartridge 32 and the sheath 22 extend in such a way as to allow said at least one magnetic element 21 to be positioned within the chamber 10A of the filter 1.

It should be noted that said at least one magnetic element 31 has said substantially rod-like conformation and the bodies 10, 20 of the filter 1 have a substantially cylindrical or cup-like shape; moreover, the magnet cartridge 32, the sheath 22 and said at least one magnetic element 31 extend within the chamber 10A in a direction parallel to a longitudinal axis A-A of the filter 1.

The magnet cartridge 32 is removable, since it can be separated from said sheath 22 and/or from said at least one magnetic element 31; in addition, the magnet cartridge 32 and the sheath 22 are preferably made of plastic material. Such provisions facilitate the cleaning of the ferrous residues captured by said at least one magnetic element 31, such cleaning being otherwise made difficult by the considerable intensity of the magnetic field exerted by said at least one magnetic element 31.

The filter 1 according to the present invention may then comprise a purging device (indicated as a whole by reference numeral 50), in particular associated with the second body 20 of the filter 1.

In a preferred embodiment, said purging device 50 comprises a purge valve 51, with which a safety cap 52 is associated; due to this provision, cleaning the filter 1 is only made possible when the user actually wants to, since such work can only be carried out by intentionally removing or unscrewing, at least partially, the cap 52 and then actuating the purge valve 51.

Preferably, the filter 1 comprises a second filtering element 35 (shown in FIG. 2), in particular of the mesh type, so realized as to have a substantially tubular shape and positioned in the chamber 10A for subjecting the fluid to be treated to a mechanical filtering, in particular for the purpose of trapping any non-ferromagnetic impurities that may be present in said fluid to be treated; as a result, said second filtering element 35 allows subjecting the fluid to a further filtering action in order to trap any non-ferromagnetic impurities that might have escaped the action of the magnetic field exerted by the magnetic filtering element 30.

In a preferred embodiment, the second filtering element 35 is so positioned in the chamber 10A as to internally enclose or contain the filtering element 30, and preferably in such a way as to internally enclose or contain the assembly consisting of the filtering element 30, the magnet cartridge 32 and the sheath 22.

Preferably, a terminal section of the second filtering element 35 joins the inner wall 411 of the shut-off element 40 to ensure the correct positioning of said second filtering element 35 inside the chamber 10A.

Moreover, the second body 20 is so shaped as to comprise a recess 23, in particular having a substantially circular shape in a front view (i.e., when viewed in a direction parallel to the axis A-A of the filter 1), which is adapted to house a terminal portion of the second filtering element 35 to allow it to be correctly positioned within the chamber 10A, in particular in cooperation with the inner wall 411 of the shut-off element 40.

The provision of a filter 1 comprising both a first filtering element 30 of the magnetic type and a second filtering element 35 of the mechanical (mesh) type ensures complete filtration of the fluid flowing in the chamber 10A. In fact, in accordance with the present invention, the flow of fluid coming from the first duct C1 is diverted by the inner wall 411 of the shut-off element 40 towards the first filtering element 30, so that it undergoes a first (magnetic) filtration, followed by a second (mechanical) filtration, through the mesh-type second filtering element 35, as it flows out from inside the chamber 10A.

The features of the filter 1 according to the present invention, as well as the advantages thereof, are apparent from the above description.

In fact, the provisions of the present invention make it possible to realize the filter 1 in a manner such that optimal removal of the impurities contained in a fluid flowing in said water supply network can be attained, while at the same time facilitating the maintenance work required for removing the residues of the impurities accumulated after the heat-transfer fluid has flowed through it many times.

In particular, the filter 1 according to the present invention allows for easy isolation of the filter 1 itself from the heating and/or cooling system; in fact, it will be sufficient to operate the shut-off element 40 to isolate the filter 1 from the system and drain only the fluid that is present within the chamber 10A in order to clean one or more of the filtering elements 30, 35 contained in said chamber 10A. Therefore, it is apparent that the provisions of the present invention make it possible to avoid having to drain the entire system when it is necessary to carry out maintenance work requiring the removal of the filtering elements for eliminating the residues of the impurities that have accumulated in the chamber 10A after the heat-transfer fluid has flowed through the filter many times.

It is therefore apparent that the provision of the shut-off element 40 makes it possible to realize the filter 1 according to the present invention in such a way that it can be optimally installed in the system without requiring the use of any additional components, such as, for example, shut-off valves positioned upstream and downstream of the filter 1; as a result, the filter 1 according to the present invention turns out to be particularly suitable for installation even in the limited space left available in modern heating and cooling systems.

Furthermore, the peculiar provisions of the filter 1 according to the present invention provide a solution that permits a considerable reduction of the costs and installation complexity of the components thereof in the system, since the filter 1 allows avoiding the purchase and installation of additional components such as, for example, shut-off valves to be positioned upstream and downstream of the filter 1.

Moreover, the provision of a filter 1 comprising at the same time both a first filtering element 30 of the magnetic type and a second filtering element 35 of the mechanical (mesh) type ensures a complete filtration of the fluid flowing in the chamber 10A.

The filter 1 for treating a fluid in a heating and/or cooling system, in particular of domestic and/or industrial type, described herein by way of example may be subject to many possible variations without departing from the novelty spirit of the inventive idea; it is also clear that in the practical implementation of the invention the illustrated details may have different shapes or be replaced with other technically equivalent elements.

The invention claimed is:

1. A filter for treating a fluid in a heating and/or cooling system, said filter comprising:
a first body, hollow, and a second body, wherein said first body and second body are mutually and sealingly connected so as to internally comprise a chamber, and wherein said hollow first body is provided with a first mouth and a second mouth respectively comprising a first duct and a second duct allowing the fluid to enter and/or exit the chamber;
a port adapted to put the chamber in communication with an environment outside the filter, said port being associated with an upper portion of the first body;
a filtering element for treating the fluid and housed at least partially in said chamber;
a shut-off element comprising a slot in communication with the port and an outer wall provided with a channel and an opening, said shut-off element being housed in the first body in a manner such that said shut-off element is rotatable about a longitudinal axis in said first body so as to enable said shut-off element to alternately switch:
from a first position, in which said shut-off element is positioned in such a way as to allow a flow of fluid to enter the chamber via a communication of the first duct with the channel and to exit the chamber via a communication of the opening with the second duct;
to a second position, in which said shut-off element is positioned in such a way that said outer wall thereof obstructs the first duct and prevents the flow of fluid from entering the chamber;
a pin formed on a top wall of the shut-off element, said pin passing through a hole formed on an upper portion of the first body; and
a knob coupled to the pin in order to facilitate the rotation of said pin and of the shut-off element, the knob having a slit adapted to allow said port to pass through and to allow said port to communicate with the chamber.

2. The filter according to claim 1, wherein the first body and the shut-off element have a cup shape, said shut-off element being so realized as to have smaller dimensions than those of inner walls of the first body.

3. The filter according to claim 1, wherein:
said first mouth and second mouth are formed on a lateral portion of the first body and are positioned on said lateral portion in opposite zones with respect to a longitudinal axis of the filter,
the channel and the opening are formed on an outer wall of the shut-off element and are positioned on said outer wall of the shut-off element in mutually opposite zones with respect to the longitudinal axis of the filter.

4. The filter according to claim 1, wherein the shut-off element comprises an inner wall developing parallel to a longitudinal axis of the filter, said inner wall being adapted to divert the flow of fluid coming from the channel towards the filtering element.

5. The filter according to claim 4, wherein the outer wall and the inner wall of the shut-off element have a tubular conformation, wherein said inner wall is positioned within the outer wall.

6. The filter according to claim 4, wherein the channel is tubular and extends radial or perpendicular to the longitudinal axis of the filter, said channel being so realized as to cross the outer wall and the inner wall and run past an interspace between said walls.

7. The filter according to claim 1, wherein said knob has a discoid shape and is provided with at least one raised portion that further facilitates handling of an assembly consisting of the knob, the pin and the shut-off element, said raised portion being shaped as an elongated protrusion formed on said knob.

8. The filter according to claim 1, wherein said slot and said slit are shaped as a circular crown sector.

9. The filter according to claim 1, wherein said filtering element is coupled to the second body of the filter, said second body comprising a passage adapted to allow insertion of the filtering element into the chamber.

10. The filter according to claim 1, wherein said filter comprises a second filtering element, the second filtering element having a tubular shape and being positioned in the chamber for subjecting the fluid to be treated to a mechanical filtering, the second filtering element being so positioned in the chamber as to internally enclose or contain the filtering element.

11. The filter according to claim 1, wherein said filter comprises a purging device associated with the second body of the filter and comprising a purge valve with which a safety cap is associated.

12. The filter according to claim 1, wherein said filtering element comprises at least one magnetic element adapted to intercept and trap ferrous impurities that are present in the fluid to be treated.

* * * * *